US010775847B2

(12) United States Patent
Shibayama et al.

(10) Patent No.: US 10,775,847 B2
(45) Date of Patent: *Sep. 15, 2020

(54) DOCKING STATION

(71) Applicant: LENOVO (SINGAPORE) PTE. LTD., Singapore (SG)

(72) Inventors: Yoshiyuki Shibayama, Kanagawa (JP); Eiji Shinohara, Kanagawa (JP); Tetsuo Ogawa, Kanagawa (JP); Shinichi Kubota, Kanagawa (JP); Xiangyang Liu, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,294

(22) Filed: Aug. 8, 2019

(65) Prior Publication Data
US 2019/0361499 A1    Nov. 28, 2019

Related U.S. Application Data

(62) Division of application No. 16/029,029, filed on Jul. 6, 2018, now Pat. No. 10,416,716.

(30) Foreign Application Priority Data

Jul. 6, 2017    (JP) .................................. 2017-132490

(51) Int. Cl.
*G06F 1/16*    (2006.01)
(52) U.S. Cl.
CPC ................... *G06F 1/1632* (2013.01)

(58) Field of Classification Search
CPC ....................................................... G06F 1/1632
See application file for complete search history.

(56) References Cited

U.S. PATENT DOCUMENTS 5,684,673 A * 11/1997 Shibasaki ............. G06F 1/1632
361/679.42
5,829,997 A * 11/1998 Okano ................. H01R 13/701
439/310

(Continued)

FOREIGN PATENT DOCUMENTS

JP    07-104884    4/1995
JP    09-070694    3/1997

(Continued)

*Primary Examiner* — Daniel P Wicklund
*Assistant Examiner* — Douglas R Burtner
(74) *Attorney, Agent, or Firm* — Antony P. Ng; Russell Ng PLLC

(57) ABSTRACT

A docking station is provided. The docking station has an engagement member, a coupling detector, a connector, an advancing and retracting mechanism, and a controller. The engagement member can be inserted into an engagement hole of a portable information device. The coupling detector detects whether or not the engagement member has been engaged with the engagement hole. The connector can be connected to a connection terminal provided in a side surface of the portable information device. The advancing and retracting mechanism is operated by the driving force of a motor to advance and retract the connector to connect and separate the connector to/from the connection terminal. The controller operates the advancing and retracting mechanism when it is detected that the portable information device is coupled with the docking station to advance the connector to connect the connector to the connection terminal.

5 Claims, 9 Drawing Sheets

(56) References Cited

U.S. PATENT DOCUMENTS

| | | | |
|---|---|---|---|
| 2012/0155014 A1* | 6/2012 | Tachibana | G06F 1/1632 361/679.41 |
| 2012/0293949 A1* | 11/2012 | Zhou | G06F 1/1632 361/679.41 |
| 2013/0080713 A1* | 3/2013 | Steinhilber | G06F 1/187 711/154 |
| 2014/0321049 A1* | 10/2014 | Ashcraft | H01R 13/6205 361/679.43 |
| 2015/0091426 A1* | 4/2015 | Ida | G11B 33/122 312/333 |
| 2016/0320801 A1* | 11/2016 | Buss | F16M 11/18 |
| 2017/0115695 A1* | 4/2017 | Vroom | G06F 1/1632 |
| 2017/0117729 A1* | 4/2017 | Hirose | A63F 13/90 |
| 2017/0160772 A1* | 6/2017 | Kamimura | H05K 7/20254 |
| 2017/0302024 A1* | 10/2017 | Morrison | H01R 13/4538 |
| 2018/0109030 A1* | 4/2018 | Nakatani | G06F 1/18 |
| 2018/0364756 A1* | 12/2018 | Lee | F16M 11/00 |
| 2019/0369666 A1* | 12/2019 | Mori | G06F 1/1626 |

FOREIGN PATENT DOCUMENTS

| | | |
|---|---|---|
| JP | 6134828 | 5/2017 |
| JP | 2017-146698 A | 8/2017 |

* cited by examiner

DOCKING STATION

RELATED APPLICATIONS

The present application is a divisional of U.S. application Ser. No. 16/029,029, filed Jul. 6, 2018, the contents of which are incorporated herein by reference.

PRIORITY CLAIM

The present application claims benefit of priority under 35 U.S.C. §§ 120, 365 to the previously filed Japanese Patent Application No. JP2017-132490 with a priority date of Jul. 6, 2017, which is incorporated by reference herein.

TECHNICAL FIELD

The present invention relates to docking stations in general, and in particular to a docking station to which a portable information device can be detachably attached.

BACKGROUND

A portable information device is configured to be lightweight and compact while having limited functions. For example, in a notebook personal computer (laptop PC), the weight or the thickness is reduced by limiting the function in some cases. To such a laptop PC, a docking station is provided as a dedicated device for extending its function. The docking station extends the function by being connector-connected to the laptop PC.

The present disclosure provides an improved docking station.

SUMMARY

In accordance with an embodiment of the present disclosure, a docking station includes an engagement member, a coupling detector, a connector, an advancing and retracting mechanism, and a controller. The engagement member can be inserted into an engagement hole of a portable information device. The coupling detector detects whether or not the engagement member has been engaged with the engagement hole. The connector can be connected to a connection terminal provided in a side surface of the portable information device. The advancing and retracting mechanism is operated by the driving force of a motor to advance and retract the connector to connect and separate the connector to/from the connection terminal. The controller operates the advancing and retracting mechanism when it is detected that the portable information device is coupled with the docking station to advance the connector to connect the connector to the connection terminal.

With above-mentioned configuration, when the portable information device is placed on a device placement portion of the docking station, a connection operation of the connector to the connection terminal is performed after the completion of an engagement operation of the engagement member to the engagement hole. Hence, when a user stops the attachment operation immediately after the user had placed the portable information device on the device placement portion, and takes up the portable information device from the device placement portion, for example, the connection operation of the connector to the connection terminal is not performed. Specifically, the docking station can prevent a situation when only the connector projects in a state where the portable information device is absent on the device placement portion. As a result, the connector is prevented from becoming an obstacle when the portable information device is attached next or the connector does not interfere in the portable information device, and the attachment operation of the portable information device can be smoothly performed.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
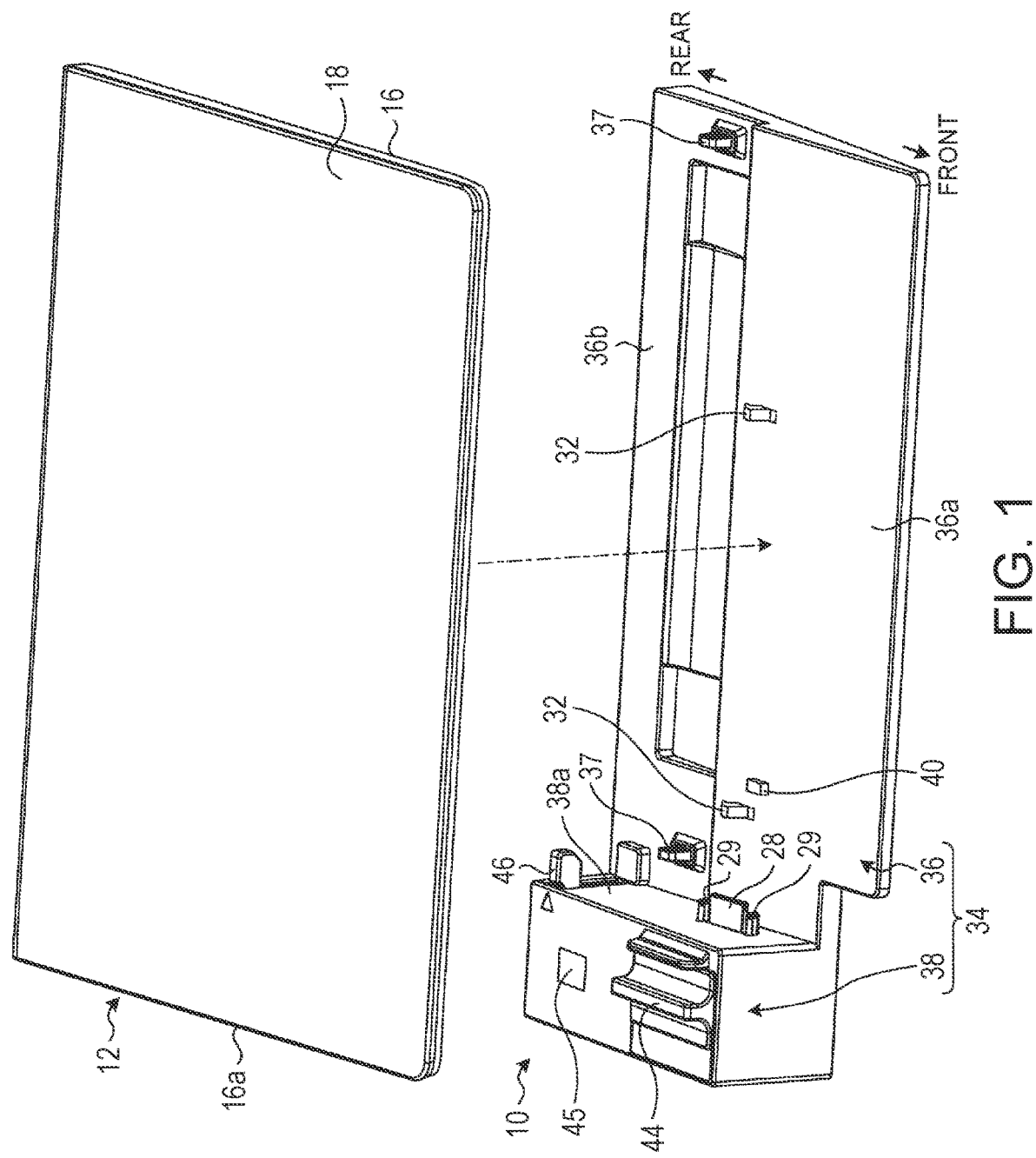
FIG. 1 is an exploded perspective view of attaching a portable information device to a docking station. according to one embodiment.
Figure 2:
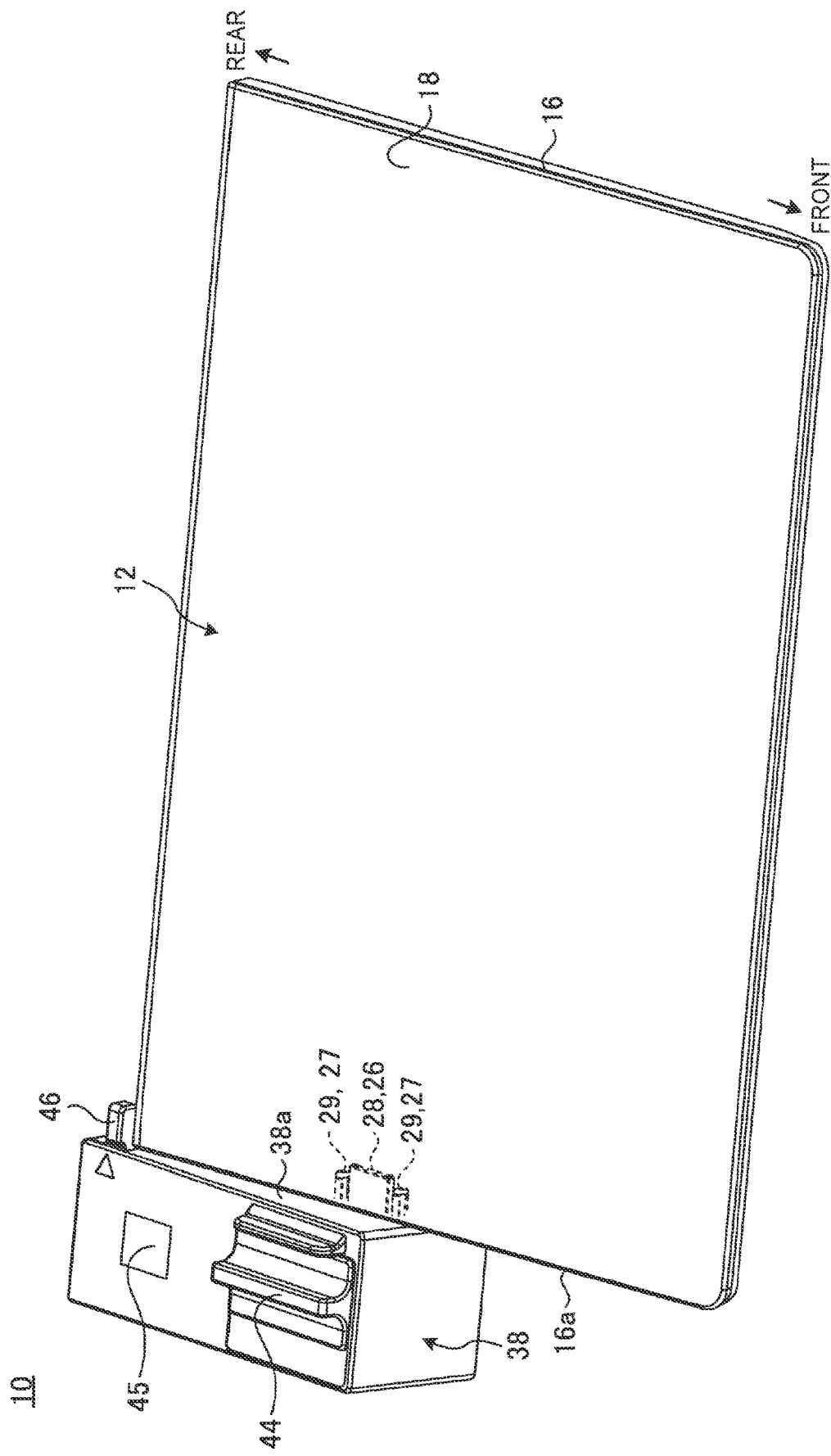
FIG. 2 is a perspective view of the portable information device being attached to the docking station from FIG. 1.
Figure 3:
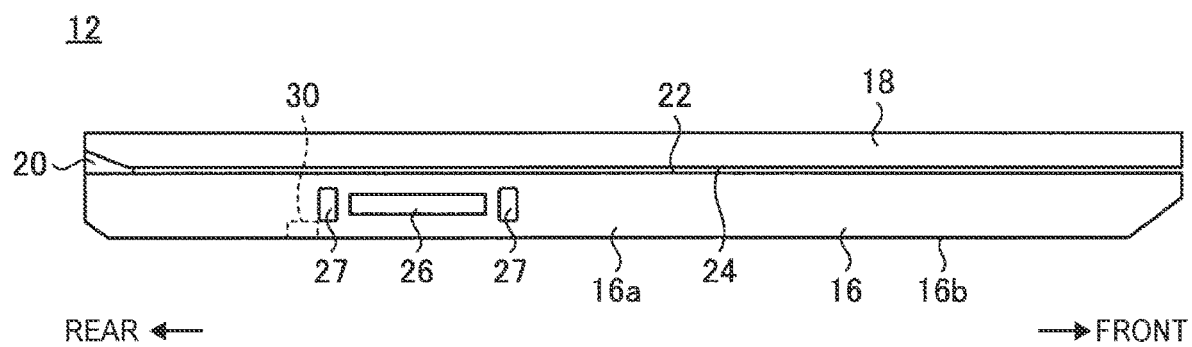
FIG. 3 is a side view of the portable information device.

FIG. 1 is an exploded perspective view of attaching a portable information device 12 to a docking station 10, according to one embodiment. FIG. 2 is a perspective view of the docking station 10 being attached to the portable information device 12. FIG. 3 is a side view of the portable information device 12.

The docking station 10 is a device that allows the portable information device 12 such as a laptop PC, for example, to be detachably attached. The docking station 10 is an extension device which extends and reinforces a processing function, a power supply function, a connection function to peripheral devices or the network, and the like of the portable information device 12 attached thereto. Therefore, the performance of each function of an electronic device in which the portable information device 12 is attached to the docking station 10 is improved as compared with a case where the portable information device 12 is used alone. The docking station 10 can also be used for extending functions of portable information devices other than the Laptop PC and may be used for extending functions of a tablet PC, a cellular phone, a smartphone, an electronic notebook, or the like, for example.

Hereinafter, a description is given defining the front side as the front, the deep side as the rear, the thickness direction of the docking station 10 as the top and the bottom, and the width direction thereof as the right and left in FIG. 2 based on a state where the portable information device 12 is mounted on the docking station 10 as illustrated in FIG. 2.

As illustrated in FIG. 3, the portable information device 12 that is an example of a connection target to the docking station 10 has a body chassis 16, a display chassis 18, and hinges 20. The portable information device 12 is a Laptop PC in which rear end portions of the body chassis 16 and the display chassis 18 are rotatably coupled with each other by the hinges 20. A keyboard 22 is provided on the inner surface of the body chassis 16 and a display 24 is provided on the inner surface of the display chassis 18.

In a side surface 16a on the left side of the body chassis 16, a connection terminal 26 and a pair of lock holes 27 and 27 are provided. The connection terminal 26 is a terminal to which a connector 28 (see FIG. 1) of the docking station 10 can be connected. The portable information device 12 can use various extension functions of the docking device 10 by the connection of the connector 28 to the connection terminal 26. The pair of lock holes 27 and 27 is disposed at both side portions of the connection terminal 26 in such a manner as to straddle the connection terminal 26. The pair of lock holes 27 and 27 can allow the engagement of a pair of lock pins 29 and 29 (see FIG. 1) of the docking station 10. The portable information device 12 is mechanically locked with the docking station 10 by the engagement of the lock pins 29 with the lock holes 27. The lock holes 27 and the lock pins 29 may not be configured so that one pair of the lock holes 27 and one pair of the lock pins 29 are individually provided to form two sets and may be configured so that one lock hole 27 and one lock pin 29 are individually provided to form one set, for example. The lock holes 27 and the lock pins 29 may be omitted.

Engagement holes 30 are provided in a bottom surface 16b of the body chassis 16. The engagement holes 30 allow the engagement of engagement members 32 of the docking station 10. A pair of right and left engagement holes 30 and a pair of right and left engagement members 32 are provided. The portable information device 12 is mechanically coupled with the docking station 10 by the engagement of the engagement members 32 with the engagement holes 30.

As illustrated in FIG. 1 and FIG. 2, the docking station 10 is used in the state where the body chassis 16 of the portable information device 12 is placed thereon. The docking station 10 has a device chassis 34 molded by synthetic resin or the like. The device chassis 34 is provided with a device placement portion 36 and an operation mechanism portion 38.

The device placement portion 36 is a thin box body which has an upper surface large enough to allow the placement of almost a half rear side portion of the portable information device 12 and is formed of synthetic resin or the like. The device placement portion 36 has a placement surface 36a inclined so that the height dimension gradually increases from the front side to the rear side. On the placement surface 36a, the bottom surface 16b of the portable information device 12 lands. On the rear side of the placement surface 36a, a flank 36b which is formed so as to be one-step lower than the placement surface 36a is provided. The flank 36b is a portion for avoiding a battery and the like which are not illustrated, when the battery and the like project from a rear portion of the bottom surface 16b of the portable information device 12. On the upper surface of the flank 36b, one pair of right and left leg materials 37 receiving the bottom surface 16b of the portable information device 12 is provided.

On the upper surface of the placement surface 36a, one engagement member 32 is provided at a leftward position and the other engagement member 32 is provided at a slightly rightward position from the center. The engagement members 32 are hook-like members projecting from the upper surface of the placement surface 36a. The engagement members 32 are provided so as to be movable in the forward and backward direction and are always energized backward. Only one or three or more engagement members 32 may be provided. On a right side portion of the left side engagement member 32, a placement detector 40 is provided. The placement detector 40 retractably projects from the upper surface of the placement surface 36a and is energized in the projection direction by an elastic body which is not illustrated. The placement detector 40 is a sensor which can be pressed down with the bottom surface 16b of the portable information device 12 and can detect whether the portable information device 12 is placed on the placement surface 36a. The engagement members 32 and the placement detector 40 may be provided so as to horizontally project from a wall portion 38a of the operation mechanism portion 38, for example.

The operation mechanism portion 38 is a box body of a rectangular parallelepiped shape having a height dimension larger than that of the device placement portion 36 and is provided on the side of the device placement portion 36.

The operation mechanism portion 38 has the wall portion 38a which is raised at a side portion of the device placement portion 36 and which is disposed facing the side surface 16a of the portable information device 12 placed on the device placement portion 36. The connector 28 and the lock pins 29 are provided so as to be able to advance and retract from the wall portion 38a toward the side surface 16a of the portable information device 12. On the upper surface of the operation mechanism portion 38, an operation lever 44 used when advancing and retracting the connector 28 and the lock pins 29 from the wall portion 38a by manual operation is provided. The operation lever 44 may be omitted. On the rearward of the upper surface of the operation mechanism portion 38, a releasing switch (attachment release operation portion) 45 is provided. The releasing switch 45 is a switch operated when the portable information device 12 is removed from the docking station 10. In a rear end portion of the wall portion 38a, a positioning member 46 is provided. When the portable information device 12 is placed on the device placement portion 36, the positioning member 46 positions the rear end surface thereof (see FIG. 2).

Such a docking station 10 carries an electric mechanism 50 automatically connecting the connector 28 and the lock pins 29 to the connection terminal 26 and the lock holes 27, respectively, after the portable information device 12 is placed on the device placement portion 36, and then the engagement members 32 are engaged with the engagement holes 30.

Figure 4:
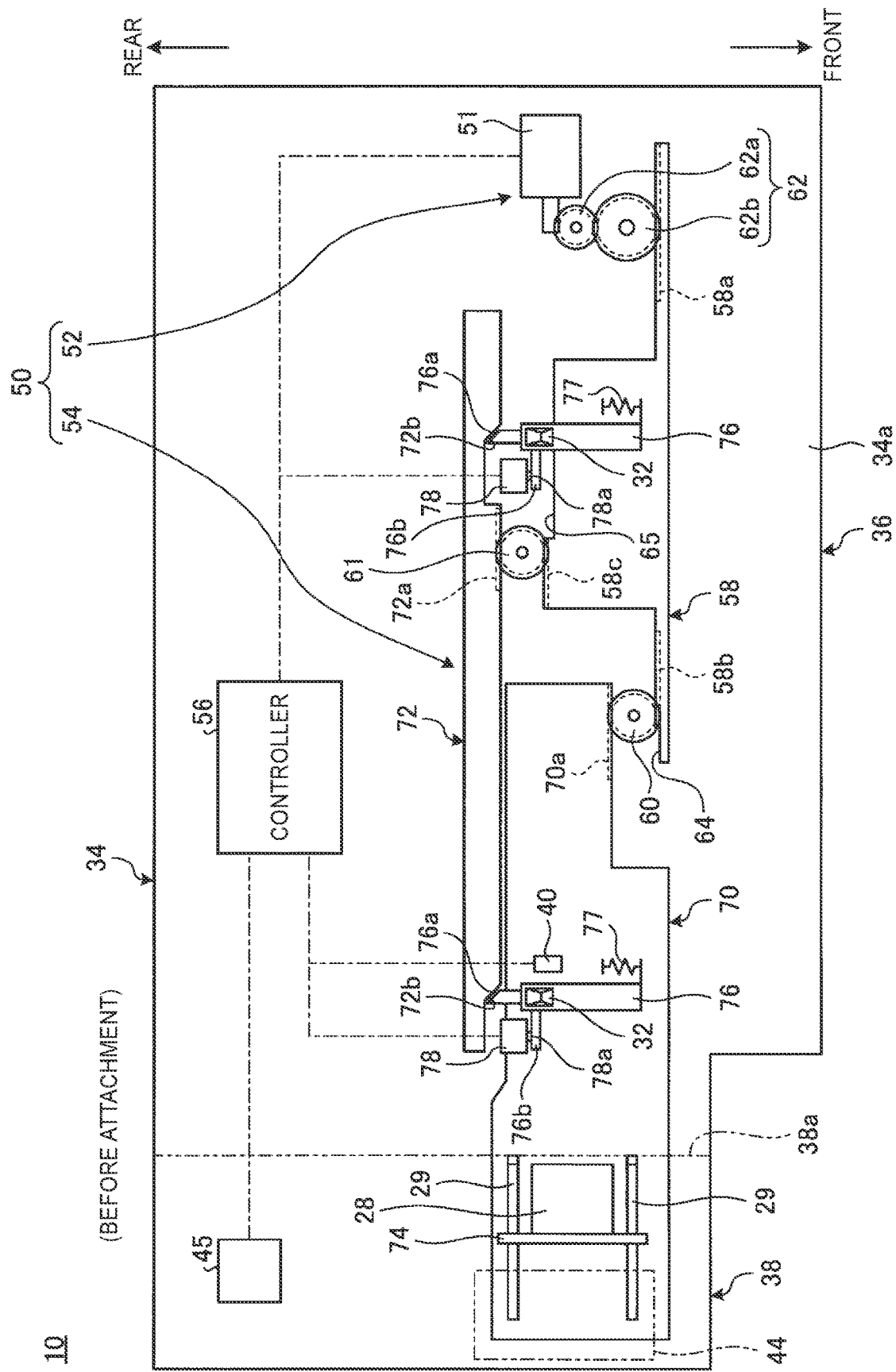
FIG. 4 is a plan view of the internal structure of the docking station.

FIG. 4 is a plan view of the internal structure of the docking station 10. As illustrated in FIG. 4, the electric mechanism 50 has a motor unit 52 having a motor 51, an advancing and retracting mechanism 54 which is operated by the driving force from the motor unit 52, and a controller 56. The electric mechanism 50 is mounted in the device chassis 34.

The motor unit 52 has the motor 51, a rack member 58, a first pinion 60, and a second pinion 61.

The motor 51 is an electric motor driven by receiving the power supply from a power supply which is not illustrated. In the motor 51, a decelerator 62 having a plurality of gears 62a and 62b is meshed with an output shaft. The decelerator 62 may contain one or three or more gears.

The rack member 58 advances and retracts in the horizontal direction by receiving the driving force of the motor 51 via the decelerator 62. The rack member 58 is a substantially T-shaped plate in which both right and left ends are formed so as to have a narrow width in the forward and backward direction. The rack member 58 is provided with an input gear 58a on the rear side surface of a right narrow width portion, a first output gear 58b on the rear side surface of a left narrow width portion, and a second output gear 58c on a left end portion of the rear side surface of a wide width portion at the center. The input gear 58a is a rack gear meshed with the gear 62b of the decelerator 62. The first output gear 58b is a rack gear meshed with the first pinion 60. The second output gear 58c is a rack gear meshed with the second pinion 61. On a left side portion of the first output gear 58b, a first sliding surface 64 is continuously formed. On a right side portion of the second output gear 58c, a second sliding surface 65 is continuously formed. The sliding surfaces 64 and 65 are flanks provided so that the pinions 60 and 61 slide without being meshed.

The motor unit 52 is a unit structure in which the motor 51, the decelerator 62, the rack member 58, the first pinion 60, and the second pinion 61 are supported by one chassis, for example. The motor unit 52 is attached and fixed to the inner surface of a base plate 34a forming the bottom surface of the device chassis 34 by screwing or the like, for example. The elements of the motor unit 52, such as the motor 51, may not have the unit structure but the elements each may be attached to and supported on the inner surface or the like of the base plate 34a.

As illustrated in FIG. 4, the advancing and retracting mechanism 54 has a slide member 70 and an engagement releasing member 72.

The slide member 70 is a member for advancing and retracting the connector 28. The slide member 70 is a plate slidably provided in the horizontal direction on the inner surface of the base plate 34a and extending in the horizontal direction. The slide member 70 has a rack gear 70a meshed with the first pinion 60 on the front side surface of a right end portion. The slide member 70 slides in the horizontal direction by receiving the rotational driving force of the first pinion 60 with the rack gear 70a. In the slide member 70, a substrate 74 supporting the connector 28 and the lock pins 29 is attached to the upper surface near a left end portion. The operation lever 44 is coupled with the left end portion of the slide member 70. Thus, the connector 28 and the lock pins 29 advance and retract in the horizontal direction by the sliding of the slide member 70 in the horizontal direction, and the operation lever 44 also simultaneously advances and retracts.

The engagement releasing member 72 is a member for releasing the engagement state of the engagement members 32 to the engagement holes 30. The engagement releasing member 72 is a plate slidably provided in the horizontal direction on the inner surface of the base plate 34a and extending in the horizontal direction. The engagement releasing member 72 is a plate having a width smaller in the forward and backward direction than the width of the slide member 70 and is disposed close to the rear side of the slide member 70. The engagement releasing member 72 has a rack gear 72a meshed with the second pinion 61 on the front side surface at a rightward position from the center. The engagement releasing member 72 slides in the horizontal direction by receiving the rotational driving force of the second pinion 61 with the rack gear 72a. The engagement releasing member 72 has pressed and inclined surfaces 72b near a right end portion and near a left end portion. The pressed and inclined surfaces 72b are inclined surfaces which are inclined from the front side to the rear side along the engagement release direction (left side in FIG. 4) of the engagement releasing member 72.

Figure 5A:
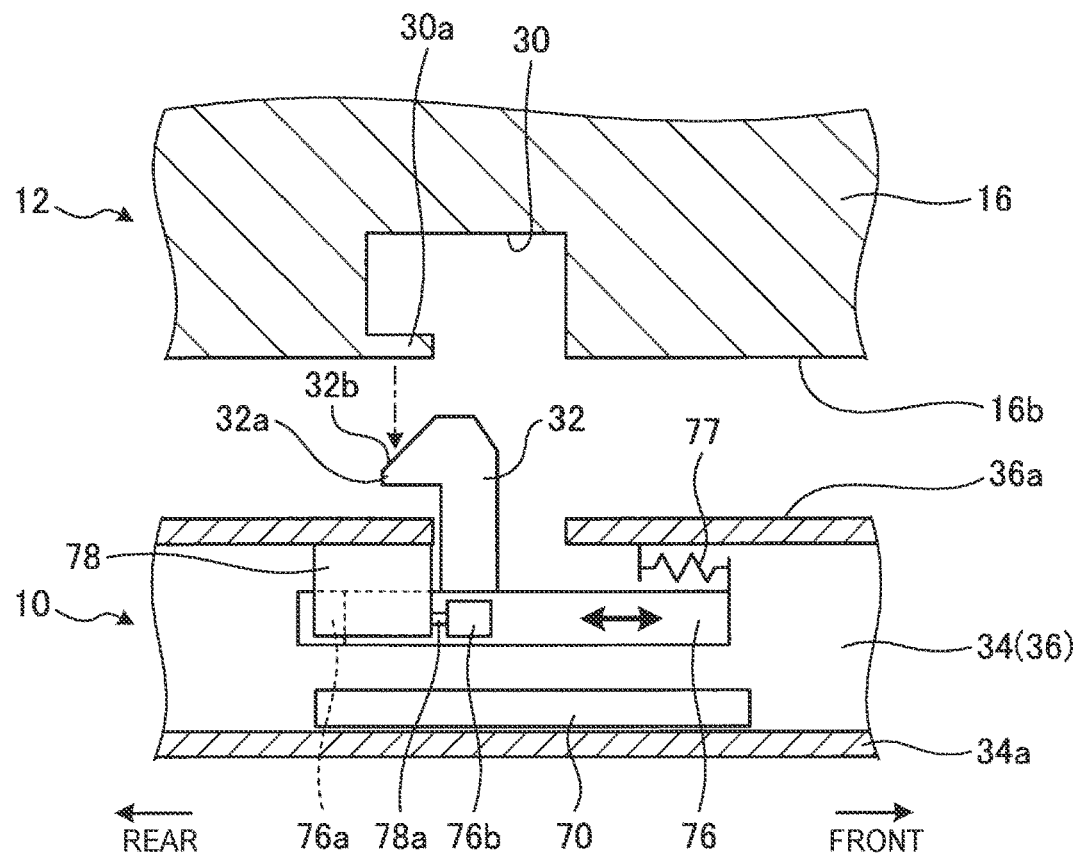
FIG. 5A is a side cross-sectional view schematically illustrating a state immediately before an engagement member is engaged with an engagement hole.
Figure 5B:
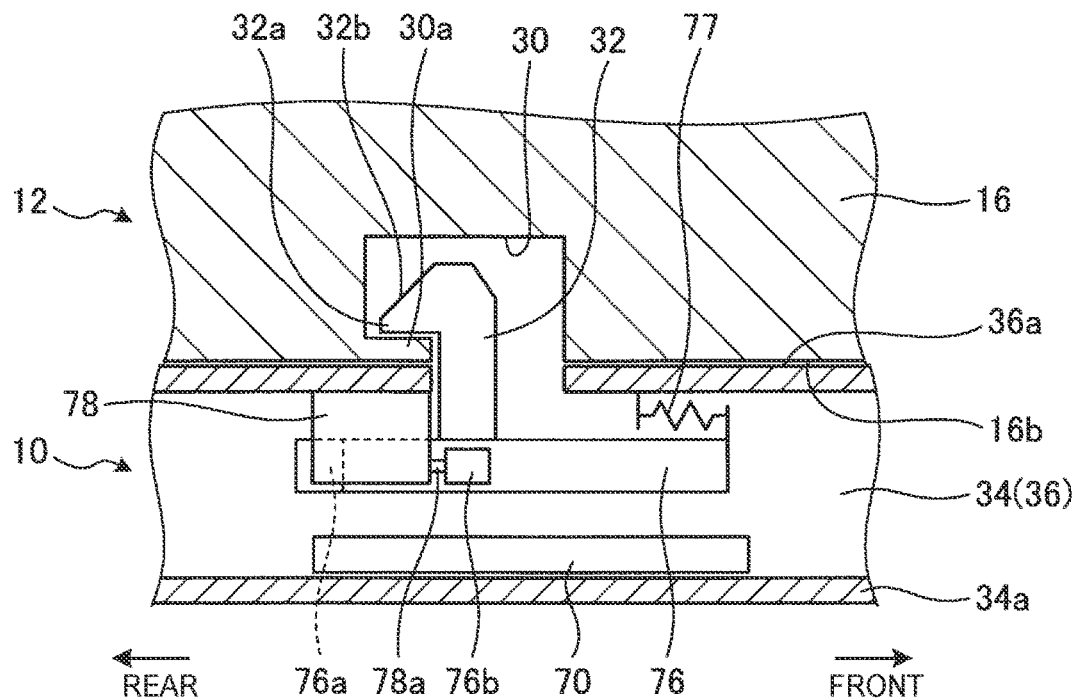
FIG. 5B is a side cross-sectional view illustrating a state where the engagement member is engaged with the engagement hole.

FIG. 5A is a side cross-sectional view illustrating a state immediately before the engagement member 32 is engaged with the engagement hole 30. FIG. 5B is a side cross-sectional view illustrating a state where the engagement member 32 is engaged with the engagement hole 30.

As illustrated in FIG. 4 and FIG. 5A, the engagement members 32 are projectingly provided on the upper surface of hook bases 76 slidably provided in the forward and backward direction within the device chassis 34. The hook bases 76 are rod-like members extending in the forward and backward direction. The hook bases 76 are supported slidably to the inner surface of the placement surface 36a, for example. The hook bases 76 are always energized by an elastic body 77 in the engagement direction (rear side in FIG. 4) in which the engagement members 32 are engaged with the engagement holes 30. The hook bases 76 each have a pressure receiving inclined surface 76a in the rear end surface and a detection piece 76b on the left side surface. The pressure receiving inclined surfaces 76a are inclined surfaces inclined from the left side to the right side along the engagement release direction (front side in FIG. 4) of the engagement members 32. The pressure receiving inclined surfaces 76a are slidably disposed facing the pressed and inclined surfaces 72b of the engagement releasing member 72. The detection pieces 76b are rod-like members projecting leftward from the left side surfaces of the hook bases 76. The detection pieces 76b can press the detection pins 78a of the coupling detectors 78 with the rear side surfaces.

As illustrated in FIG. 5A, the engagement member 32 is a hook-like member having a nail portion 32a which can slide and can be engaged with a locking piece 30a of the engagement hole 30. The outer surface of the nail portion 32a has an inclined surface 32b gradually inclined from the upper side to the lower side toward the engagement direction (left side in FIG. 5A) to the engagement hole 30 of the engagement member 32.

As illustrated in FIG. 5A and FIG. 5B, when the portable information device 12 is placed on the placement surface 36a, the inclined surface 32b slides with the locking piece 30a, whereby the engagement member 32 retracts in the engagement release direction (right side in FIG. 5A) together with the hook bases 76 against the energization force of the elastic body 77. Then, when the inclined surface 32b rides over the locking piece 30a, the engagement member 32 advances in the engagement direction by the energization force of the elastic body 77 together with the hook base 76, so that the nail portion 32a is engaged with the engagement hole 30 (locking piece 30a) as illustrated in FIG. 5B. Thus, the docking station 10 and the portable information device 12 are mechanically coupled with each other by the engagement members 32. At this time, due to the generation of a lock sound when the engagement member 32 which is a hook-like member is engaged with the engagement hole 30, a user can recognize that the portable information device 12 is certainly coupled with the device placement portion 36.

As illustrated in FIG. 4, the controller 56 is a control portion receiving an ON signal or an OFF signal from the coupling detectors 78 and the placement detector 40 to drive and control the motor 51. Furthermore, the controller 56 also drives and controls the motor 51 based on an attachment release signal from the releasing switch 45. The controller 56 may be realized by causing a processing device, such as a CPU (Central Processing Unit) which is a central processing unit, for example, to execute a program, i.e., by software, may be realized by hardware, such as an integrated circuit (IC), or may be realized using the software and the hardware in combination.

When the portable information device 12 is placed on the placement surface 36a of the device placement portion 36, for example, the controller 56 drives the motor 51 to cause the motor 51 to perform the attachment operation of the docking station 10 to the portable information device 12. Moreover, the controller 56 causes the motor 51 to perform the attachment release operation of releasing the attachment state of the portable information device 12 to the docking station 10 when the releasing switch 45 is operated, for example.

Next, the attachment operation of the docking station 10 and the portable information device 12 is described.

Figure 6:
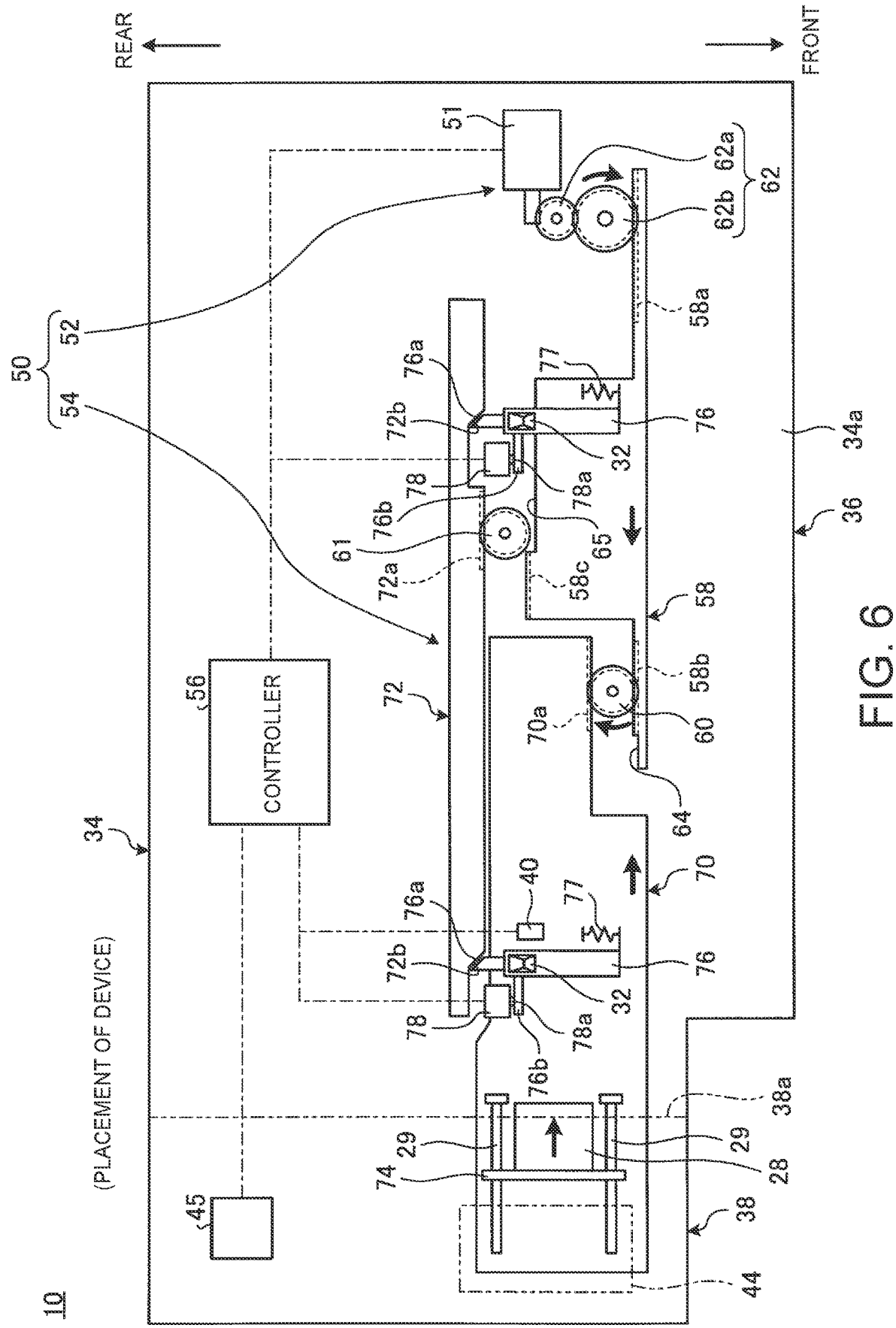
FIG. 6 is a plan view illustrating a state during the placement of the portable information device on a device placement portion from the state illustrated in FIG. 4.
Figure 7:
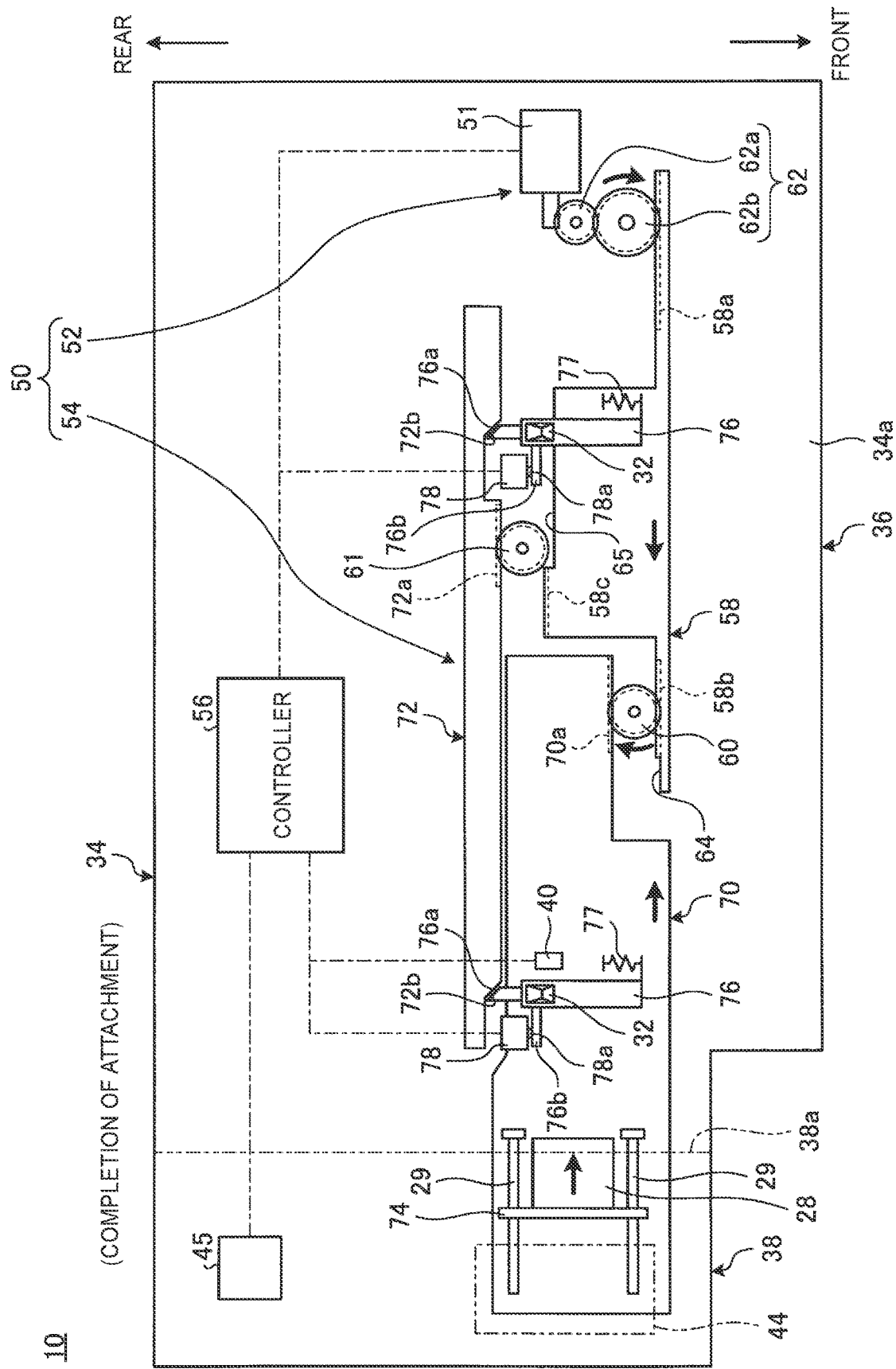
FIG. 7 is a plan view illustrating a state where the engagement member and an electric mechanism are operated to complete the attachment operation from the state illustrated in FIG. 6.
Figure 8:
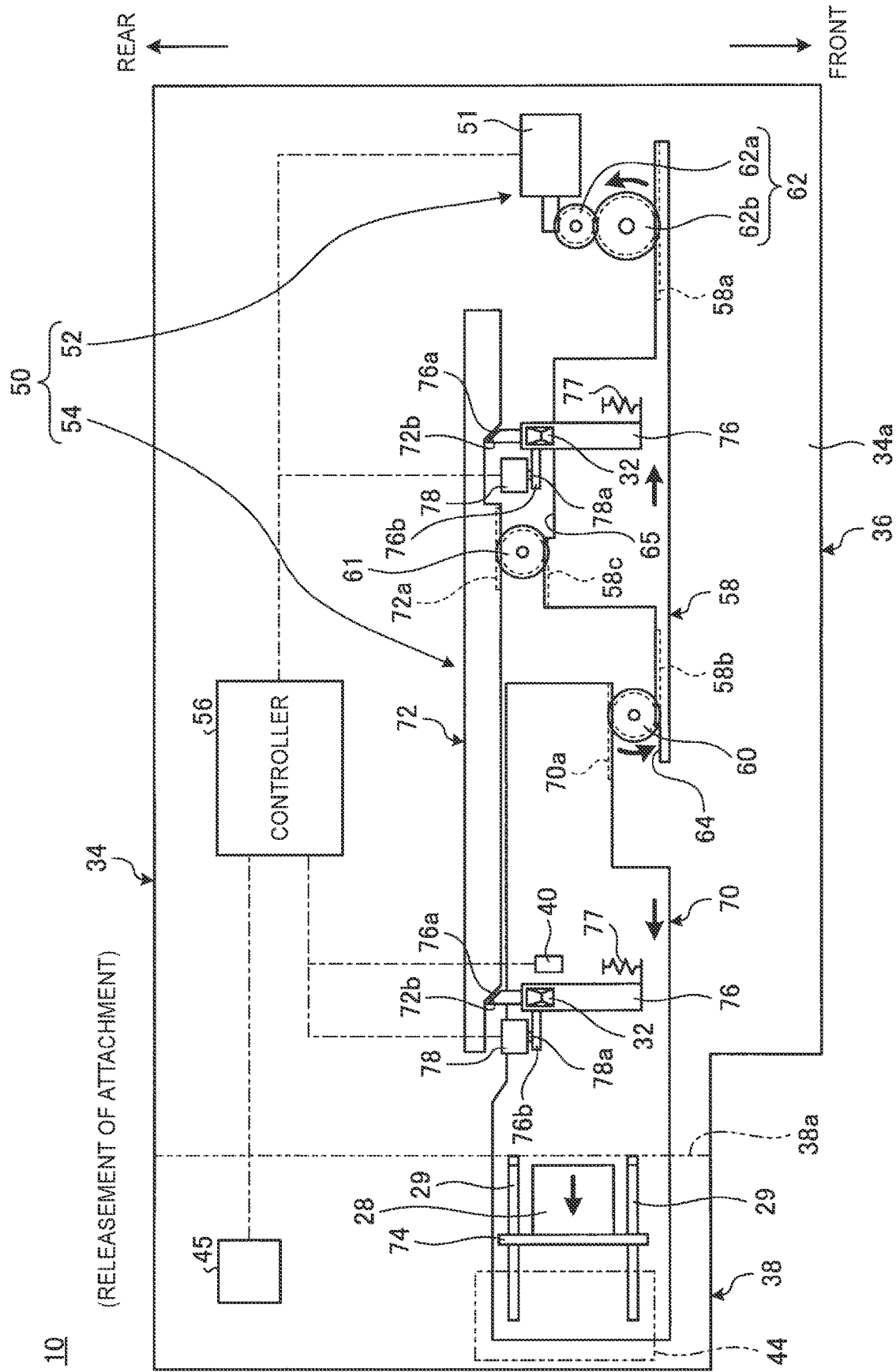
FIG. 8 is a plan view illustrating a state where a releasing switch is operated, and then the electric mechanism is operated, so that the connector retracts from the state illustrated in FIG. 7.
Figure 9:
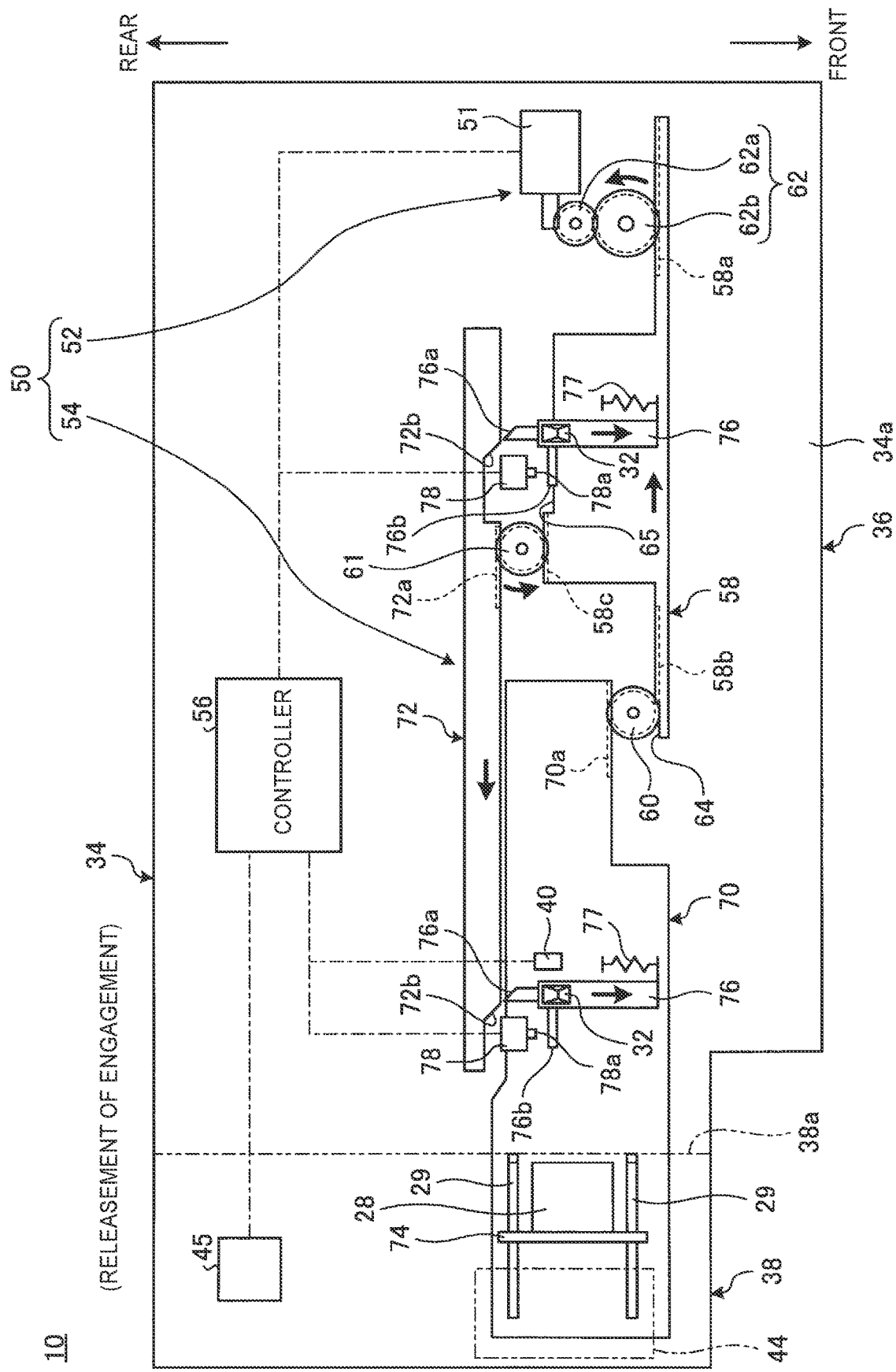
FIG. 9 is a plan view illustrating a state where the electric mechanism is continuously operated, so that the engagement member retracts from the state illustrated in FIG. 8.

FIG. 6 is a plan view illustrating a state during the placement of the portable information device 12 on the device placement portion 36 from the state illustrated in FIG. 4. FIG. 7 is a plan view illustrating a state where the engagement members 32 and the electric mechanism 50 are operated, so that the attachment operation is completed from the state illustrated in FIG. 6. FIG. 8 is a plan view illustrating a state where the releasing switch 45 is operated, and then the electric mechanism 50 is operated, so that the connector 28 retracts from the state illustrated in FIG. 7. FIG. 9 is a plan view illustrating a state where the electric mechanism 50 is continuously operated, so that the engagement members 32 retract from the state illustrated in FIG. 8.

First, in a state (initial state) before the docking station 10 is attached to the portable information device 12, the slide member 70 is located at the initial position where the slide member 70 slides to the leftmost side as illustrated in FIG. 4. In this state, the connector 28 and the lock pins 29 are located at a position buried inside the wall portion 38a. The engagement releasing member 72 is located at the initial position where the engagement releasing member 72 retracts to the rightmost side. Therefore, in the hook bases 76, the pressure receiving inclined surfaces 76a do not receive the pressing force from the pressed and inclined surfaces 72b of the engagement releasing member 72. As a result, the engagement members 32 are located at an engagement position where the engagement members 32 advance to the rearmost side by the energization force of the elastic body 77 (see FIG. 5A).

When the device placement portion 36 is attached to the portable information device 12 from the initial state, rear end corner portions of the portable information device 12 are first brought into contact with the positioning member 46 to be positioned and placed on the device placement portion 36 as illustrated in FIG. 1 and FIG. 2. Thus, the side surface 16a in which the connection terminal 26 and the lock holes 27 are provided of the portable information device 12 is disposed facing the wall portion 38a of the operation mechanism portion 38. Simultaneously, the inclined surface 32b slides with the locking piece 30a of the engagement hole 30 (see the arrows indicated by the solid lines in FIG. 5A and FIG. 6), and then the engagement member 32 retracts once to the front side in a non-engagement direction against the energization force of the elastic body 77. Subsequently, when the inclined surface 32b rides over the locking piece 30a, the engagement member 32 advances again to the rear side which is the engagement direction to be engaged with the engagement hole 30 (see the arrows indicated by the dashed lines in FIG. 6). Thus, the portable information device 12 is brought into a state of being mechanically coupled with the docking station 10 through the engagement members 32. At this time, the placement detector 40 is operated so as to be pressed down by the bottom surface 16b of the portable information device 12. FIG. 6 illustrates a state where the engagement members 32 are located at positions where the engagement members 32 retract to the foremost side (engagement release position).

In such an engagement operation of the engagement members 32 to the engagement holes 30, the hook bases 76 move from an ON position where the detection pieces 76b press the detection pins 78a of the coupling detectors 78 to an OFF position where the detection pieces 76b are separated from the detection pins 78a, and then move to the ON position again. Then, the controller 56 determines that the engagement operation of the engagement members 32 to the engagement holes 30 is completed when receiving that the coupling detectors 78 output ON signals after OFF signals, and then performs the attachment operation of driving and controlling the motor 51 in the attachment direction.

The controller 56 may perform control so as to perform the attachment operation when receiving not only the output information of the coupling detectors 78 but an ON signal from the placement detector 40. This can certainly prevent a malfunction that a user accidentally operates the engagement members 32 by a fingertip or the like, so that the attachment operation is performed even though the portable information device 12 is not placed on the device placement portion 36 in fact.

When the attachment operation is performed, the rack member 58 advances to the left side through the decelerator 62 as illustrated in FIG. 7, and then the first pinion 60 meshed with the first output gear 58b rotates clockwise in the figure. Therefore, the slide member 70 slides to the right side by receiving the driving force from the first pinion 60 with the rack gear 70a. As illustrated in FIG. 7, when the rack member 58 advances to the left side, the second pinion 61 slides on the second sliding surface 65, and thus does not rotate. Therefore, the engagement releasing member 72 does not move and remains at the initial position.

When the slide member 70 slides to the right side, the connector 28 and the lock pins 29 also advance to the right side. Then, when the slide member 70 slides to the rightmost side as illustrated in FIG. 7, the connector 28 is connected to the connection terminal 26 and the lock pins 29 are inserted into the lock holes 27.

The lock pins 29 may be configured so as to be rotationally driven by 90? after being inserted into the lock holes 27, and then tip portions thereof are engaged with the lock holes 27 in a cross shape (see FIG. 7). Thus, the portable information device 12 is brought into a state of being mechanically locked with the docking station 10 through the lock pins 29. For the rotation operation of the lock pins 29, a motor which is not illustrated may be utilized or a link mechanism, which is not illustrated, provided between the slide member 70 and the lock pins 29 may be used, for example. The rotation operation of the lock pin 29 may be performed by inserting the lock pin 29 into a key hole, which is not illustrated, provided in one side surface of the operation mechanism portion 38, and then inserting a lock key into the key hole to perform the rotation operation, for example. The lock pin 29 may be one not performing the rotation operation and merely functioning as a positioning pin.

Thus, in the docking station 10, when the portable information device 12 is placed on the device placement portion 36 in the initial state illustrated in FIG. 4, the electric mechanism 50 is operated after the completion of the engagement operation of the engagement members 32 to the engagement holes 30, so that the connector 28 is connected to the connection terminal 26. As a result, the attachment of the portable information device 12 to the docking station 10 is completed.

Next, when the portable information device 12 in the attachment state illustrated in FIG. 7 is removed from the docking station 10, the releasing switch 45 is operated. Thus, the controller 56 performs the attachment release operation of driving and controlling the motor 51 in the attachment release direction opposite to the attachment direction.

When the attachment release operation is performed, the rack member 58 retracts to the right side through the decelerator 62 as illustrated in FIG. 8, and then the first pinion 60 meshed with the first output gear 58b rotates counterclockwise in the figure. Therefore, the slide member 70 slides to the left side by receiving the driving force from the first pinion 60 with the rack gear 70a this time. When the rack member 58 advances to the right side as illustrated in FIG. 7, the second pinion 61 slides on the second sliding surface 65 at the timing when the slide member 70 slides, and thus does not rotate. Therefore, the engagement releasing member 72 does not move and remains at the initial position also this time.

When the slide member 70 slides to the left side, the connector 28 and the lock pins 29 also retract to the left side. Then, when the slide member 70 slides to the leftmost side as illustrated in FIG. 8, the connector 28 is separated from the connection terminal 26 and the lock pins 29 are separated from the lock hole 27. As a result, the connector 28 and the lock pins 29 return to the position buried inside the wall portion 38a. When the lock pins 29 are in the lock state of being engaged with the lock holes 27, the lock pins 29 are reversely rotated by 90? before separating from the lock holes 27, so that the engagement state to the lock holes 27 is released.

However, also after the connector 28 is separated from the connection terminal 26, the engagement state of the engagement members 32 to the engagement holes 30 is maintained. Then, in the attachment release operation, the controller 56 continues the drive in the attachment release direction of the motor 51 also after sliding the slide member 70 to the leftmost side.

Thus, the second pinion 61 is meshed with the second output gear 58c as illustrated in FIG. 9, and then rotates counterclockwise in the figure. Therefore, the engagement releasing member 72 advances to the left side by receiving the driving force from the second pinion 61 with the rack gear 72a. At the timing when the engagement releasing member 72 advances to the left side as illustrated in FIG. 9, the first pinion 60 slides on the first sliding surface 64, and thus does not rotate. Therefore, the slide member 70 does not move and the position of the connector 28 is not also changed.

When the engagement releasing member 72 advances to the left side, the pressed and inclined surfaces 72b press the inclined surfaces 76a of the hook bases 76 while sliding the same. Therefore, the hook bases 76 retract to the front side against the energization force of the elastic body 77 as illustrated in FIG. 9, and then the engagement members 32 retract in the engagement release direction to the engagement holes 30. Finally, the pressed and inclined surfaces 72b ride over the pressure receiving inclined surfaces 76a, and then the pressure receiving inclined surfaces 76a abut on the front side surface of the engagement releasing member 72, whereby the hook bases 76 are held at positions where the hook bases 76 retract to the foremost side. As a result, the engagement members 32 are held at the engagement release position where the nail portions 32a are separated from the locking pieces 30a in a state of being disposed in the engagement holes 30. The timing when the engagement members 32 are located at the engagement release position is determined based on a detection result of a predetermined control program or the coupling detector 78, and then the controller 56 stops the drive in the engagement release direction of the motor 51.

When the portable information device 12 is completely separated from the docking station 10, the portable information device 12 is raised from the placement surface 36a of the device placement portion 36 in the attachment release state illustrated in FIG. 9. Then, the pressed-down state by the bottom surface 16b of the portable information device 12 is released, and therefore the placement detector 40 is raised to be returned to the initial position, and then outputs an OFF signal. When receiving the OFF signal of the placement detector 40, the controller 56 determines that the portable information device 12 is taken up from the placement surface 36a, and then drives and controls the motor 51 in the attachment direction. As a result, the engagement releasing member 72 retracts to the right side this time. Therefore, the hook bases 76 advance again to the front side which is the engagement direction while the pressure receiving inclined surfaces 76a are sliding with the pressed and inclined surfaces 72b by the energization force of the elastic body 77. At this time, at the timing when the engagement releasing member 72 retracts, the first pinion 60 slides on the first sliding surface 64, and thus does not rotate. Therefore, the slide member 70 does not move and the position of the connector 28 is not also changed.

Finally, due to the fact that the engagement members 32 return to the engagement position again, the coupling detector 78 outputs an ON signal again by the detection pieces 76b. Then, the controller 56 stops the drive in the attachment direction of the motor 51 by receiving the ON signal. As a result, the rack member 58, the engagement releasing member 72, and the engagement members 32 return to the initial position again illustrated in FIG. 4 in the state where the slide member 70 is maintained at the initial position illustrated in FIG. 4, and then the docking station 10 returns to the initial state again.

As described above, the docking station 10 according to this embodiment has the device placement portion 36 on which the portable information device 12 is placed, the engagement members 32 which are engaged with the engagement holes 30 of the portable information device 12 placed on the device placement portion 36 to couple the device placement portion 36 with the portable information device 12, the coupling detector 78 detecting that the engagement members 32 are engaged with the engagement holes 30, the connector 28 which can be connected to the connection terminal 26 provided in the side surface 16a of the portable information device 12 placed on the device placement portion 36, and the advancing and retracting mechanism 54 which is operated by the driving force of the motor 51 to advance and retract the connector 28 to connect and separate the connector 28 to/from the connection terminal 26. Furthermore, the docking station 10 has the controller 56 which operates the advancing and retracting mechanism 54 when it is detected that the portable information device 12 is coupled with the device placement portion 36 by the coupling detector 78 to advance the connector 28 to connect the connector 28 to the connection terminal 26.

Therefore, according to the docking station 10, in the case of attaching the portable information device 12, when the portable information device 12 is placed on the device placement portion 36, the connection operation of the connector 28 to the connection terminal 26 is performed after the completion of the engagement operation of the engagement members 32 to the engagement holes 30. Therefore, even when a user stops the attachment operation immediately after the user places the portable information device 12 on the device placement portion 36, and then the user takes up the portable information device 36 from the device placement portion 36, for example, the controller 56 does not drive the motor 51, and thus the connection operation of the connector 28 to the connection terminal 26 is not performed. More specifically, the docking station 10 can prevent a state where only the connector 28 projects in a state where the portable information device 12 is absent on the device placement portion 36. As a result, the connector 28 is prevented from becoming an obstacle when the portable information device 12 is attached next or the connector 28 does not interfere in the portable information device 12, and thus the attachment operation of the portable information device 12 including the connection of the connector 28 can be certainly and smoothly performed.

In other words, the controller 56 configures a connection regulation portion which regulates the operation of the advancing and retracting mechanism 54 until it is detected that the portable information device 12 is coupled with the device placement portion 36 by the coupling detector 78 and regulates the connection operation of the connector 28 to the connection terminal 26.

The docking station 10 has the releasing switch 45 releasing the attachment state in which the portable information device 12 is coupled with the device placement portion 36 and the connector 28 is connected to the connection terminal 26. When the releasing switch 45 is operated, the controller 56 operates the advancing and retracting mechanism 54 to separate the connector 28 from the connection terminal 26, and then operates the engagement members 32 to release the engagement state of the engagement members 32 to the engagement holes 30. Thus, in the attachment release operation, the docking state 10 is maintained in the state where the engagement members 32 are engaged with the engagement holes 30 until the connector 26 is separated from the connection terminal 26. This can prevent the application of an excessive load to a connection portion between the connector 28 and the connection terminal 26 due to the fact that the portable information device 12 is raised from the device placement portion 36 in the state where the connector 28 remains connected to the connection terminal 26.

The docking device has the placement detector 40 detecting that the portable information device 12 is placed on the device placement portion 36 by being pressed down by the portable information device 12. Therefore, by the use of the placement detector 40 in the attachment release operation, for example, the control of maintaining the engagement members 32 at the engagement release position until the portable information device 12 is taken up from the device placement portion 36 can be easily performed after the releasing switch 45 is operated. Moreover, by the use of the placement detector 40 in the attachment operation, for example, the portable information device 12 is certainly placed on the device placement portion 36 and the control of performing the attachment operation only when the engagement members 32 are engaged with the engagement holes 30 is enabled. As a result, a malfunction that the attachment operation is performed even though the portable information device 12 is not actually placed on the device placement portion 36 can be certainly prevented.

The docking station 10 can drive the slide member 70 and the engagement releasing member 72 through the one rack member 58 driven by the motor 51 at desired timing, and thus the structure is simplified and the number of components can be reduced. The engagement releasing member 72 may be configured so as to operate independently of the slide member 70 or the rack member 58 by the driving force of a separately provided motor instead of the motor 51, for example.

It is a matter of course that the present invention is not limited to the embodiments described above and can be freely altered without deviating from the scope of aspects of the present invention.

The description above describes the configuration in which the engagement members 32 are hook-like members as an example. However, the engagement members 32 may be configured so that T-bar-shaped members rotate around a shaft to be engaged with the engagement holes 30 in a cross shape, for example. Moreover, the advancing and retracting direction of the engagement members 32 may not be the forward and backward direction and may be the horizontal direction and the like.

In the description above, the docking station 10 is configured so that the advancing and retracting operation of the connector 28 and the like are performed by the electric mechanism 50 using the motor 51. However, the docking station 10 can be easily altered to a simple configuration in which the motor unit 52 of the unit structure is removed, and then the advancing and retracting operation of the connector 28 and the like are performed by manual operation of the operation lever 44, for example. According to this configuration, a link mechanism interlocking the slide of the slide member 70 and the slide of the engagement releasing member 72 may be provided between the slide member 70 and the engagement releasing member 72, and the slide member 70 and the like may be slid by the operation lever 44.

As has been described, the present invention provides an improved docking station in which a horizontal connector is provided on the side of a device placement portion of the docking station.

While the invention has been particularly shown and described with reference to a preferred embodiment, it will be understood by those skilled in the art that various changes in form and detail may be made therein without departing from the spirit and scope of the invention.

What is claimed is:

1. A docking station comprising:
    a device placement portion on which a portable information device is to be placed;
    a placement detector for detecting that said portable information device has been placed on said device placement portion by being pressed down by said portable information device;
    an engagement member to be engaged with an engagement hole of said portable information device when said portable information device has been placed on said device placement portion;

a coupling detector detects whether or not said engagement member has been engaged with said engagement hole;

a connector connects to a connection terminal provided in a side surface of said portable information device;

an advancing and retracting mechanism advances said connector to connect said connector to said connection terminal; and a control portion operates said advancing and retracting mechanism, when said coupling detector detects that said portable information device is coupled with said device placement portion, to advance said connector to connect said connector to said connection terminal.

2. The docking station of claim 1, wherein when said portable information device is detected to be coupled with said device placement portion by said coupling detector and said portable information device is placed on said device placement portion, said control portion operates said advancing and retracting mechanism to advance said connector to connect said connector to said connection terminal.

3. The docking station of claim 1. wherein said control portion operates said engagement member to release to said engagement hole of said engagement member, maintains said engagement member at an engagement release position to said engagement hole until said placement detector has detected that said portable information device is separated from said device placement portion, and then returns said engagement member to an initial position before said engagement member is engaged with said engagement hole from said engagement release position after said placement detector has detected that said portable information device is separated from said device placement portion.

4. A docking station comprising:

a device placement portion on which a portable information device is to be placed;

an engagement member to be engaged with an engagement hole provided in a bottom surface of said portable information device when said portable information device has been placed on said device placement portion;

a coupling detector detects whether or not said engagement member has been engaged with said engagement hole;

a connector connects to a connection terminal provided in a side surface of said portable information device;

an advancing and retracting mechanism advances said connector to connect said connector to said connection terminal; and a control portion operates said advancing and retracting mechanism, when said coupling detector detects that said portable information device is coupled with said device placement portion, to advance said connector to connect said connector to said connection terminal.

5. The docking station of claim 4, wherein said engagement member is a hook-like member energized in said engagement direction to said engagement hole.

* * * * *